(12) United States Patent
Borlick et al.

(10) Patent No.: US 11,461,112 B2
(45) Date of Patent: Oct. 4, 2022

(54) DETERMINING FEATURE SETTINGS FOR CODE TO DEPLOY TO A SYSTEM BY TRAINING A MACHINE LEARNING MODULE

(71) Applicant: International Business Machines Corporation, Armonk, NY (US)

(72) Inventors: Matthew G. Borlick, Tucson, AZ (US); Lokesh M. Gupta, Tucson, AZ (US); Matthew R. Craig, Sahuarita, AZ (US); Micah Robison, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 730 days.

(21) Appl. No.: 16/270,530

(22) Filed: Feb. 7, 2019

(65) Prior Publication Data
US 2020/0257539 A1  Aug. 13, 2020

(51) Int. Cl.
| | |
|---|---|
| *G06F 9/445* | (2018.01) |
| *G06F 11/07* | (2006.01) |
| *G06F 11/36* | (2006.01) |
| *G06F 8/60* | (2018.01) |
| *G06N 20/00* | (2019.01) |

(52) U.S. Cl.
CPC .......... *G06F 9/44505* (2013.01); *G06F 8/60* (2013.01); *G06F 11/0721* (2013.01); *G06F 11/0772* (2013.01); *G06F 11/3664* (2013.01); *G06F 11/3688* (2013.01); *G06N 20/00* (2019.01)

(58) Field of Classification Search
CPC .... G06F 9/44505; G06F 8/60; G06F 11/0721; G06F 11/0772; G06F 11/3664; G06F 11/3688; G06N 20/00
See application file for complete search history.

(56) References Cited

U.S. PATENT DOCUMENTS

| | | | | |
|---|---|---|---|---|
| 7,013,331 | B2* | 3/2006 | Das | H04L 29/06 709/220 |
| 7,386,839 | B1* | 6/2008 | Golender | G06F 11/366 717/130 |
| 7,984,515 | B1* | 7/2011 | Patsenker | G06F 8/61 726/31 |

(Continued)

FOREIGN PATENT DOCUMENTS

| | | |
|---|---|---|
| CN | 105184366 B | 12/2015 |
| WO | WO2018098575 A1 | 6/2018 |

OTHER PUBLICATIONS

English Translation for CN105184366B, published on Dec. 23, 2015, Total 13 pp.

*Primary Examiner* — Douglas M Slachta
(74) *Attorney, Agent, or Firm* — Konrad Raynes Davda & Victor LLP; David W. Victor

(57) ABSTRACT

Provided are a computer program product, system, and method for determining feature settings for code to deploy to a system by training a machine learning module. A determination is made of an outcome of running system code on a system having configuration settings and feature settings of features in the system to enable or disable in response to the outcome. A machine learning module is trained to produce the feature settings indicating to enable or disable the features in response to input comprising the configuration settings of the system.

20 Claims, 8 Drawing Sheets

(56) References Cited

U.S. PATENT DOCUMENTS

| | | | | |
|---|---|---|---|---|
| 9,430,227 | B2* | 8/2016 | Verma | G06F 9/4451 |
| 9,800,466 | B1* | 10/2017 | Rangole | H04L 41/0816 |
| 10,398,056 | B1* | 8/2019 | Bryan | H05K 7/18 |
| 10,560,816 | B2* | 2/2020 | Sohn | H04W 4/12 |
| 10,884,762 | B1* | 1/2021 | Truong | G06F 11/1469 |
| 11,138,003 | B2* | 10/2021 | Glazer | G06F 9/44505 |
| 2005/0166207 | A1* | 7/2005 | Baba | G06F 9/5066 |
| | | | | 718/105 |
| 2008/0052706 | A1* | 2/2008 | Isaacson | G06F 8/63 |
| | | | | 717/174 |
| 2011/0307742 | A1* | 12/2011 | Kudo | G06F 11/0706 |
| | | | | 714/39 |
| 2013/0318396 | A1* | 11/2013 | Plate | G06F 11/3612 |
| | | | | 714/25 |
| 2014/0237595 | A1* | 8/2014 | Sridhara | G06F 21/566 |
| | | | | 709/224 |
| 2015/0358810 | A1* | 12/2015 | Chao | H04W 4/50 |
| | | | | 455/418 |
| 2015/0363554 | A1* | 12/2015 | Farrell | G16H 10/60 |
| | | | | 705/3 |
| 2016/0291989 | A1* | 10/2016 | Spitzer | G06F 8/77 |
| 2017/0024642 | A1 | 1/2017 | Xiong et al. | |
| 2017/0108995 | A1* | 4/2017 | Ali | G06F 3/0481 |
| 2017/0109507 | A1* | 4/2017 | Farrell | H04L 67/06 |
| 2017/0169059 | A1* | 6/2017 | Horowitz | H04L 9/0891 |
| 2017/0330069 | A1 | 11/2017 | Liu | |
| 2017/0373500 | A1 | 12/2017 | Shafi et al. | |
| 2018/0004507 | A1* | 1/2018 | Aijaz | G06F 8/71 |
| 2018/0024614 | A1* | 1/2018 | Bhadra | G06F 1/3287 |
| | | | | 713/324 |
| 2018/0285086 | A1* | 10/2018 | O'Malley | G06F 8/65 |
| 2018/0285763 | A1* | 10/2018 | Bharti | G06N 20/00 |
| 2019/0068443 | A1* | 2/2019 | Li | H04L 41/0823 |
| 2019/0129401 | A1* | 5/2019 | Chai | G05B 23/0216 |
| 2019/0306023 | A1* | 10/2019 | Vasseur | H04L 41/082 |
| 2020/0133711 | A1* | 4/2020 | Webster | G06F 8/30 |
| 2020/0242000 | A1* | 7/2020 | Khosrowpour | G06F 11/3608 |

* cited by examiner

DETERMINING FEATURE SETTINGS FOR CODE TO DEPLOY TO A SYSTEM BY TRAINING A MACHINE LEARNING MODULE

BACKGROUND OF THE INVENTION

1. Field of the Invention

The present invention relates to a computer program product, system, and method for determining feature settings for code to deploy to a system by training a machine learning module.

2. Description of the Related Art

When new code is deployed in a system, the user may have to disable features available at the system if they notice that certain enabled features are interfering with the code operations or impeding code performance. Often a user has to manually disable certain features when troubleshooting problems. Further, the code developer may provide information through support or web pages of features to disable to improve the code performance.

There is a need in the art for improved techniques for deploying code at a user system in a manner that is compatible with the system configuration and feature settings.

SUMMARY

Provided a computer program product, system, and method for determining feature settings for code to deploy to a system by training a machine learning module. A determination is made of an outcome of running system code on a system having configuration settings and feature settings of features in the system to enable or disable in response to the outcome. A machine learning module is trained to produce the feature settings indicating to enable or disable the features in response to input comprising the configuration settings of the system.

DETAILED DESCRIPTION

Loading new code into a system may result in errors and performance problems when interacting with the configuration of the system and enabled features. In current art, the user may need to determine on their own which system features need to be disabled or enabled to improve the performance of the code or go to a support web site to determine what changes to their features to make to address problems in the code performance.

Described embodiments provide improvements to computer technology for selecting which features for a system configuration to enable or disable to improve the performance of newly installed code. In described embodiments, an outcome is determined from running system code on a system having configuration settings for various system resources, such as storage resources, cache, copy operations, etc. The outcome may comprise an error or performance measurements of the system code running on the system for a set of feature settings. A determination is made of the feature settings of features in the system to enable or disable in response to the outcome. For instance, if the outcome comprises an error code, then the features related to the error code would be disabled in the determined feature settings. If the outcome of running the code was a best or optimal performance measurement, then the determined feature settings would be those features enabled or disabled when the optimal performance measure was experienced. A machine learning module is then trained to produce indication of the determined feature settings to enable or disable features in response to input of the system. In this way, the machine learning module is trained to produce optimal feature settings of features to enable or disable for a given system configurations.

The trained machine learning module may be deployed at user systems to determine the optimal feature settings of features to enable or disable for running the system code. In this way, feature settings are determined that optimize performance or avoid error codes by training a machine learning module with input configuration settings to produce the best performing and error minimizing feature settings to implement for the system code. Further, by training the machine learning module on test or user systems with numerous different configuration settings to produce the feature settings that optimize system performance, the machine learning module can provide feature settings to optimize performance for a larger number of possible configuration settings.

Figure 1:
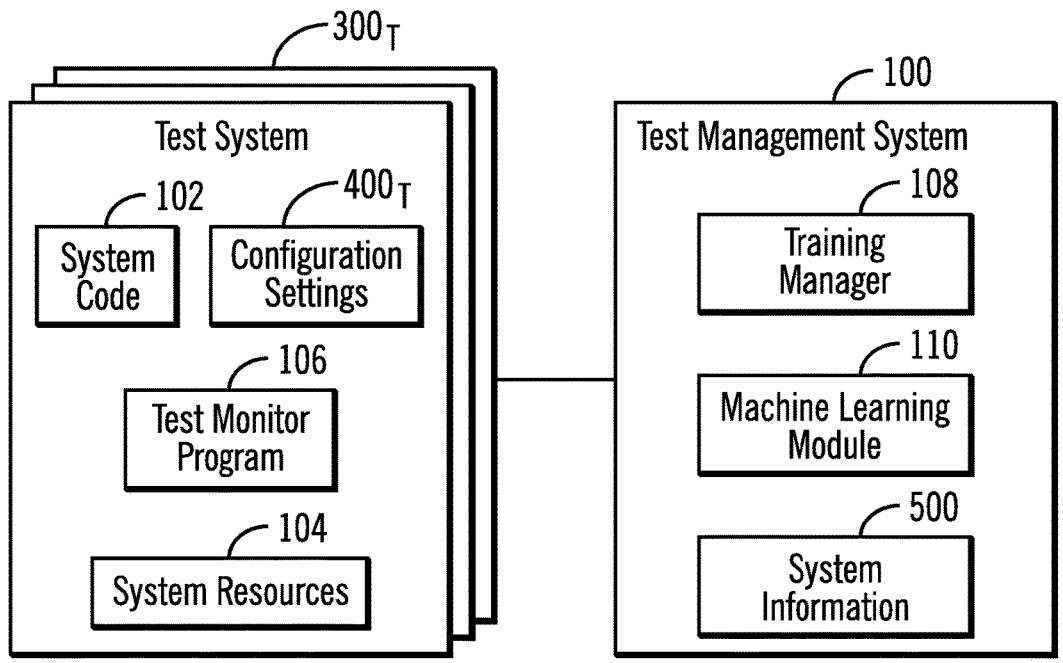
FIG. 1 illustrates an embodiment of a testing computing environment.

FIG. 1 illustrates an embodiment of a development environment having a test management system 100 and a plurality of test systems $300_T$ that test how feature settings in the test systems $300_T$ effect the operation of system code 102 being tested for deployment to determine optimal feature settings of features to disable and enable when the system code 102 is executing. Each test system $300_T$ has configuration settings 400 indicating the configuration of system resources 104 at the system $300_T$, such as the configuration of storage devices, cache, processor threads, copy relationships, etc. Each test system $300_T$ further includes a test monitor program 106 to mange the testing of the system code 102 under different feature settings, i.e., different combinations of the system features disabled or enabled.

System features are those operating system, device, and program features at a system that can be disabled or enabled. Examples include whether synchronous read and write operations are enabled to have each thread performing a read or write wait until the operation completes (synchronous I/O), whether I/O priority manager is enabled to process I/O requests according to priority and throttle or delay certain lower priority requests, whether host caching of data is enabled, whether parallel access to volumes is enabled, whether backups not accessible to the host system and outside the production environment are frequently created, etc.

The test management system 100 includes a training manager 108 to interact with the test monitor program 106 to receive performance measurements for system $300_T$ performance for different combinations of feature settings, e.g., features enabled or disabled. The training manager 108 may store the performance results at the test systems $300_T$ realized for different combinations of feature settings in the code execution outcome information 500. The training manager 108 may then train a machine learning module 110 to produce as output the feature settings used in the test system $300_T$ that resulted in the best performance measurement for the configuration settings 400 at the test system $300_T$. Performance measurements may include latency in I/O processing, number of errors occurring, processor and memory performance and levels of use, system resource stability, etc.

Figure 2:
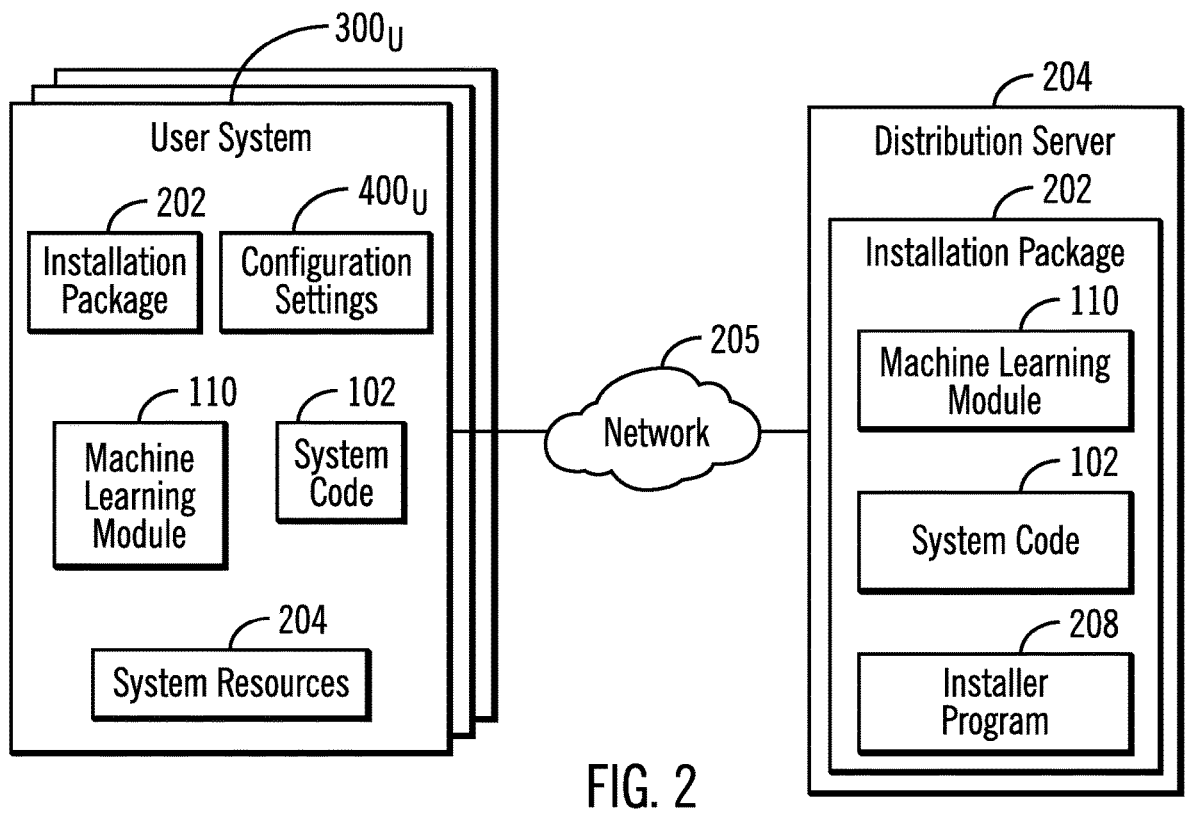
FIG. 2 illustrates an embodiment of a code distribution environment.

FIG. 2 illustrates an embodiment of a distribution environment in which the system code 102 and the machine learning module 110, tested to generate optimum feature settings for different system configuration settings 400 of system resources 204, are included in an installation package 202 for a distribution server 204 to distribute over a network 205, such as the Internet, a local area network (LAN), wide area network (WAN), storage area network (SAN), etc., to user systems $300_U$. The installation package 202 further includes an installer program 208 to execute at the user system $300_U$ to install the system code 102 and input the user system $300_U$ configuration settings $400_U$ to the machine learning module 110 to determine the optimum feature settings for the user system $300_U$ to implement when running the system code 102.

Figure 3:
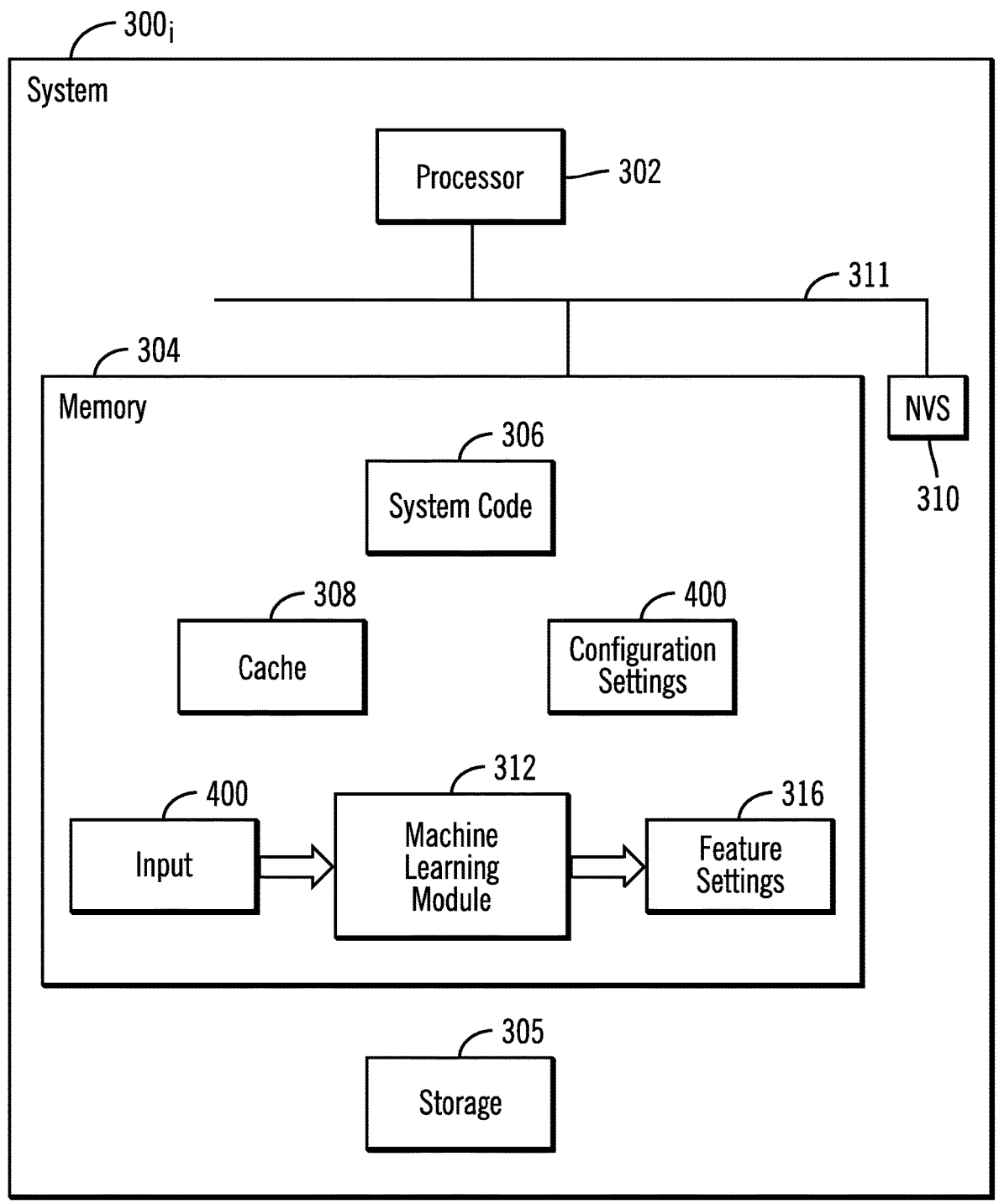
FIG. 3 illustrates an embodiment of a system.

FIG. 3 illustrates an embodiment of a system $300_i$, such as the test systems $300_T$ and user systems $300_U$, including a processor 302, such as one or more processor devices, and a memory 304 having program code executed by the processor 302. The memory 304 includes system code 306, such as system code 102, which may comprise an operating system or I/O manager to manage requests from attached hosts to a storage 305 comprised of storage arrays configured in the storage devices, which are part of the system resources. The memory 304 includes a cache 308 to cache tracks from the storage 305 and a non-volatile storage ("NVS") 310 to provide a backup storage of modified tracks. The processor 302, memory 204, and NVS 210 communicate over a bus interface 311.

The memory 304 may comprise a suitable volatile or non-volatile memory devices, including those described above. The NVS 310 may comprise a suitable non-volatile memory device, such as a SSD, flash memory device, battery-backed up DRAM, RRAM, PCM, etc. Other non-volatile devices may be used for the non-volatile storage 310 such as a battery backed-up DIMM. The cache 308, NVS 310, and storage 305 may comprise the system resources, such as system resources 104, 204.

The memory 304 includes a machine learning module 312, such as the trained machine learning module 110, that receives as input the configuration settings 400 and outputs feature settings 316 indicating whether features in the system $300_i$ are disabled or enabled.

The machine learning module 312 implements a machine learning technique such as decision tree learning, association rule learning, artificial neural network, inductive programming logic, support vector machines, Bayesian models, etc., to determine the feature settings 316.

In one embodiment, the machine learning module 312 may comprise artificial neural network programs. In neural network implementations, weights and biases in a hidden layer of nodes would be assigned to these inputs to indicate their predictive quality in relation to other of the inputs based on training to reach desired output values for the queues for which the machine learning module 312 is producing outputs.

The neural network may be trained using backward propagation to adjust weights and biases at nodes in a hidden layer to produce adjusted feature settings based on the provided input 400. A margin of error may be determined with respect to the actual feature settings 316 from the machine learning module 312 and desired feature settings to train the machine learning module 312 to produce the desired feature settings, which may comprise those that have best performance measurements for the system or have features disabled that have produced fatal errors. In backward propagation, the margin of error of the output is measured and the weights and biases at nodes in the hidden layer are adjusted accordingly to decrease the error. Backward propagation may comprise an algorithm for supervised learning of artificial neural networks using gradient descent. Given an artificial neural network and an error function, the method may calculate the gradient of the error function with respect to the neural network's weights and biases.

The system 300 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage 305 may be comprised of different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage 305 may further be configured as ranks in storage devices, such as Just a Bunch of Disks (JBOD), Direct Access Storage Device (DASD), Redundant Array of Independent Disks (RAID) array, virtualization device, etc. Further, storage devices in the storage 305 may comprise heterogeneous storage devices from different vendors and different types of storage devices, such as a first type of storage devices, e.g., hard disk drives, that have a slower data transfer rate than a second type of storage devices, e.g., SSDs.

The system code 102, 306 and machine learning module 110, 312 may be implemented in computer readable program instructions in a computer readable storage medium executed by a processor and/or firmware implemented in computer hardware, such as an Application Specific Integrated Circuit (ASIC).

Figure 4:
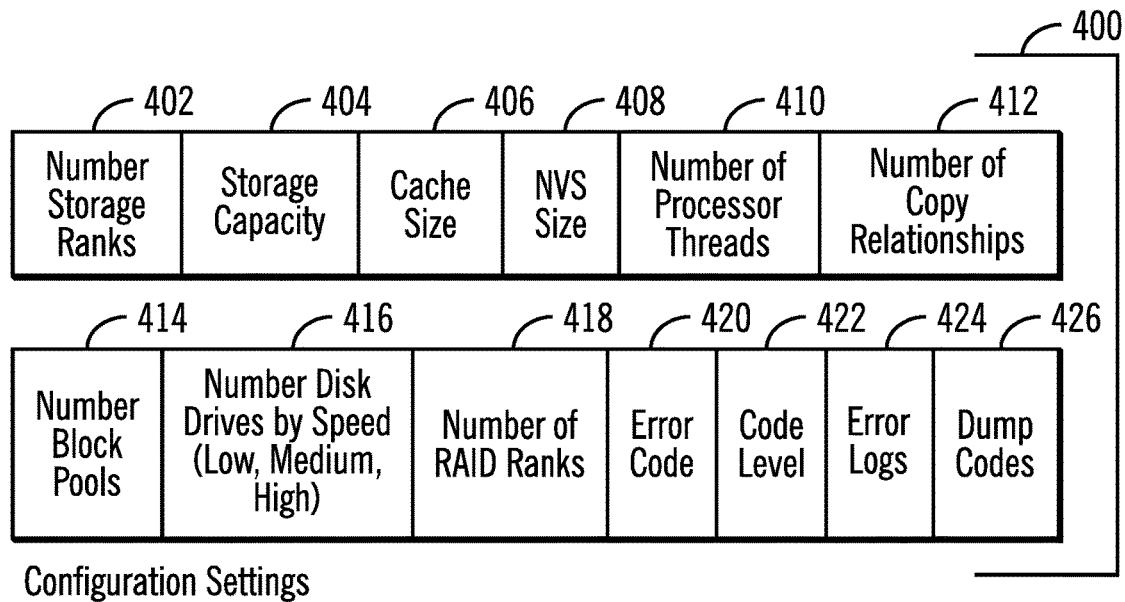
FIG. 4 illustrates an embodiment of configuration settings.

FIG. 4 illustrates an embodiment of examples of configuration settings 400 in a system $300_i$ that would be provided as input to the machine learning module 110, 312 to determine the output feature settings 316, indicating whether each of a set of features for programs should be enabled or disabled when executing the system code 102, 306, and includes, but is not limited to: number of storage ranks 402, such as RAID ranks, configured in the storage 305; storage capacity 404 of the storage 305; cache size 406 of the cache 308; NVS size 408 of the NVS 310; number of processor threads 410 currently allocated at the processor 302; number of copy relationships 412 active in the system $300_i$, such as point-in-time copies, mirroring copies (asynchronous, synchronous, peer-to-peer, remote), etc.; number of block pools 414 of blocks available for assigning to volumes, such as fixed block and Count key Data (CKD) block pools; number of disk drives 416 by speed, such as number of low, medium, and high disk drives, including division by Solid State Disks (SSD) and hard disk drives; number of RAID ranks 418; error codes 420 that are logged; a code level 422 of the system code 102, 306; error logs 424 indicating fatal and non-fatal errors; and dump codes 426 of errors resulting in data dumps. Additional configuration settings may also be provided that could impact the execution of the system code 102, 306.

The configuration settings 400 in a system $300_i$ may be determined from a registry file or by querying system settings and devices for configuration settings.

Figure 5:
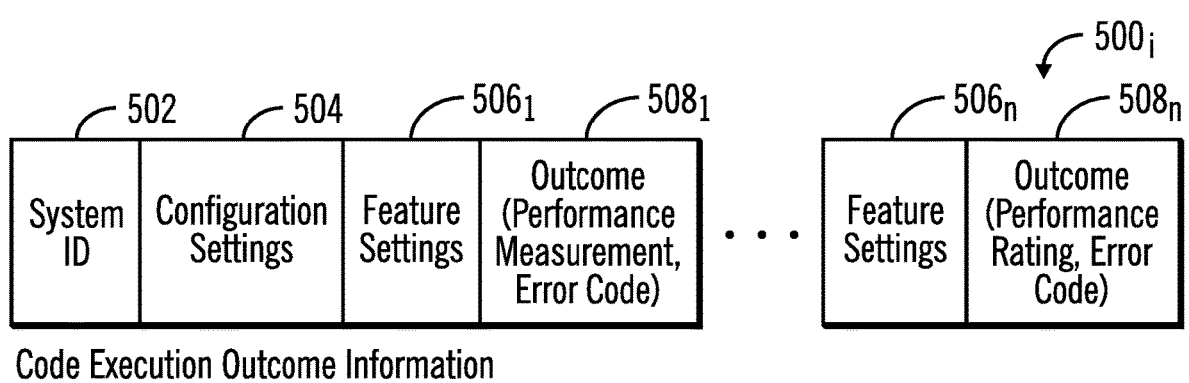
FIG. 5 illustrates an embodiment of code execution outcome information based on configuration and feature settings at a system.

FIG. 5 illustrates an embodiment of an instance of code execution outcome information $500_i$ the test monitor program 106 or training manager 108 generate to use to train the machine learning module 110, and may include: a test system identifier (ID) 502 of the test system $300_T$ at which the information was generated; configuration settings 504 at the test system 502, e.g., $400_T$; and then one or more pairs of feature settings $506_1 \ldots 506_n$, and outcomes $508_1 \ldots 508_n$ of the test system 502 running the system code 102, 306 with the configuration settings 504 and feature settings $506_i$, where the outcomes $508_i$ may comprise a performance measurement, error code or some other outcome of running the system code. The code execution outcome information $500_i$ may also be generated at user systems $300_U$ that report outcomes to the test management system 100 to further improve the training of the machine learning module 110.

Figure 6:
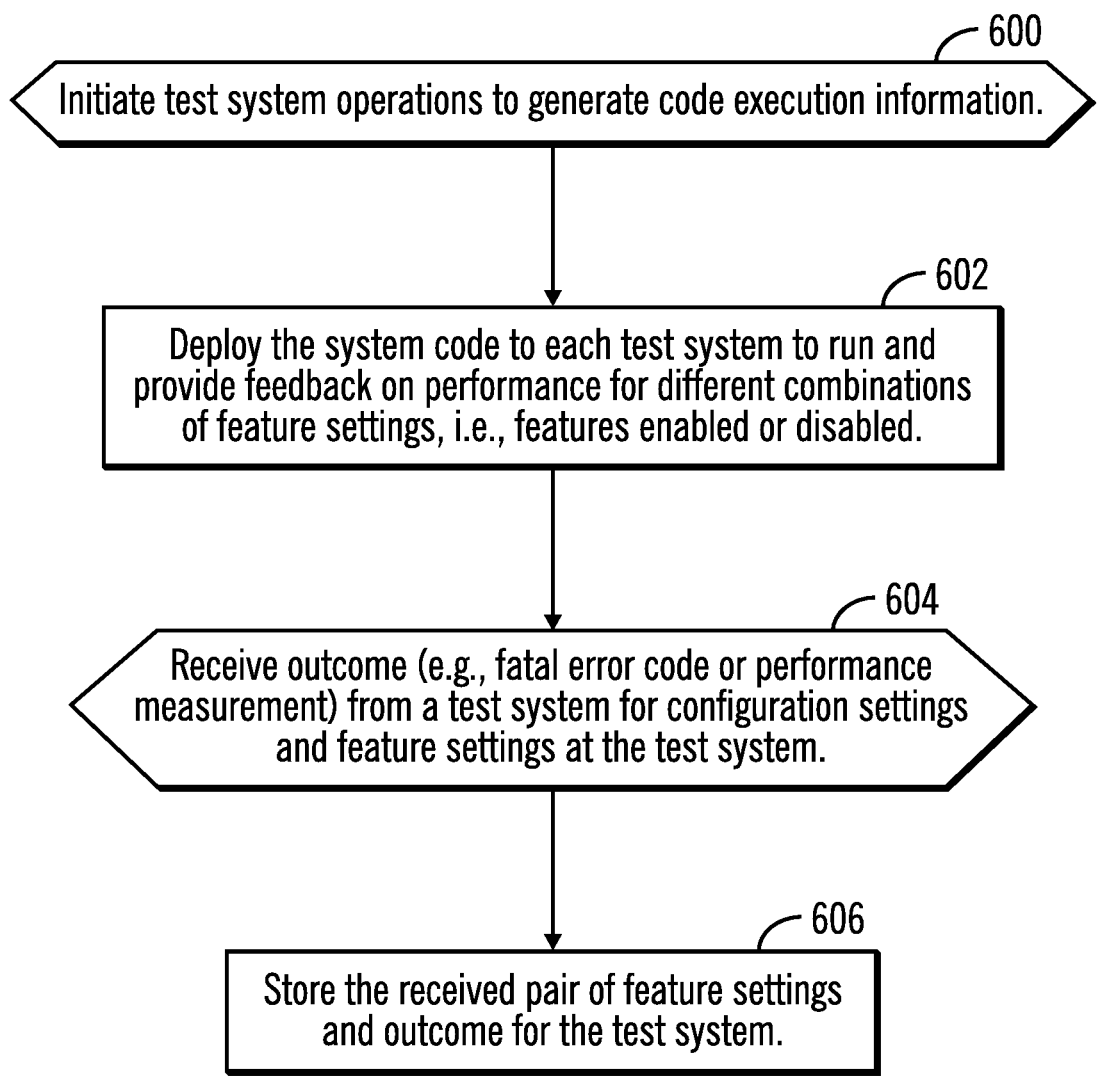
FIG. 6 illustrates an embodiment of test system operations to generate code execution information.

FIG. 6 illustrates an embodiment of operations performed by the training manager 108 to train the machine learning module 110 at the test system $300_T$. Upon initiating (at block 600) the training, the training manager 108 deploys (at block 602) the system code 102 to each test system $300_T$ to run and provide feedback on performance for different combinations of feature settings, i.e., features enabled or disabled. Upon receiving (at block 604) from the test monitor program 106 at the user system $300_U$ code execution outcome information $500_i$ (e.g., fatal error code or performance measurement) while running the system code 102 with configuration settings 504, e.g., $400_T$, and feature settings $506_i$ of features enabled $508_i$, the training manager 108 stores (at block 606) the received pair of feature settings $506_i$ and outcome $508_i$ in the code execution outcome information $500_i$. The training manager 108 may also receive the test information from user systems $300_U$ that report outcomes while running the system code 102 as part of normal production operations to allow for continued and improved training of the machine learning module 110 to use for future deployments of the system code 102.

Figure 7:
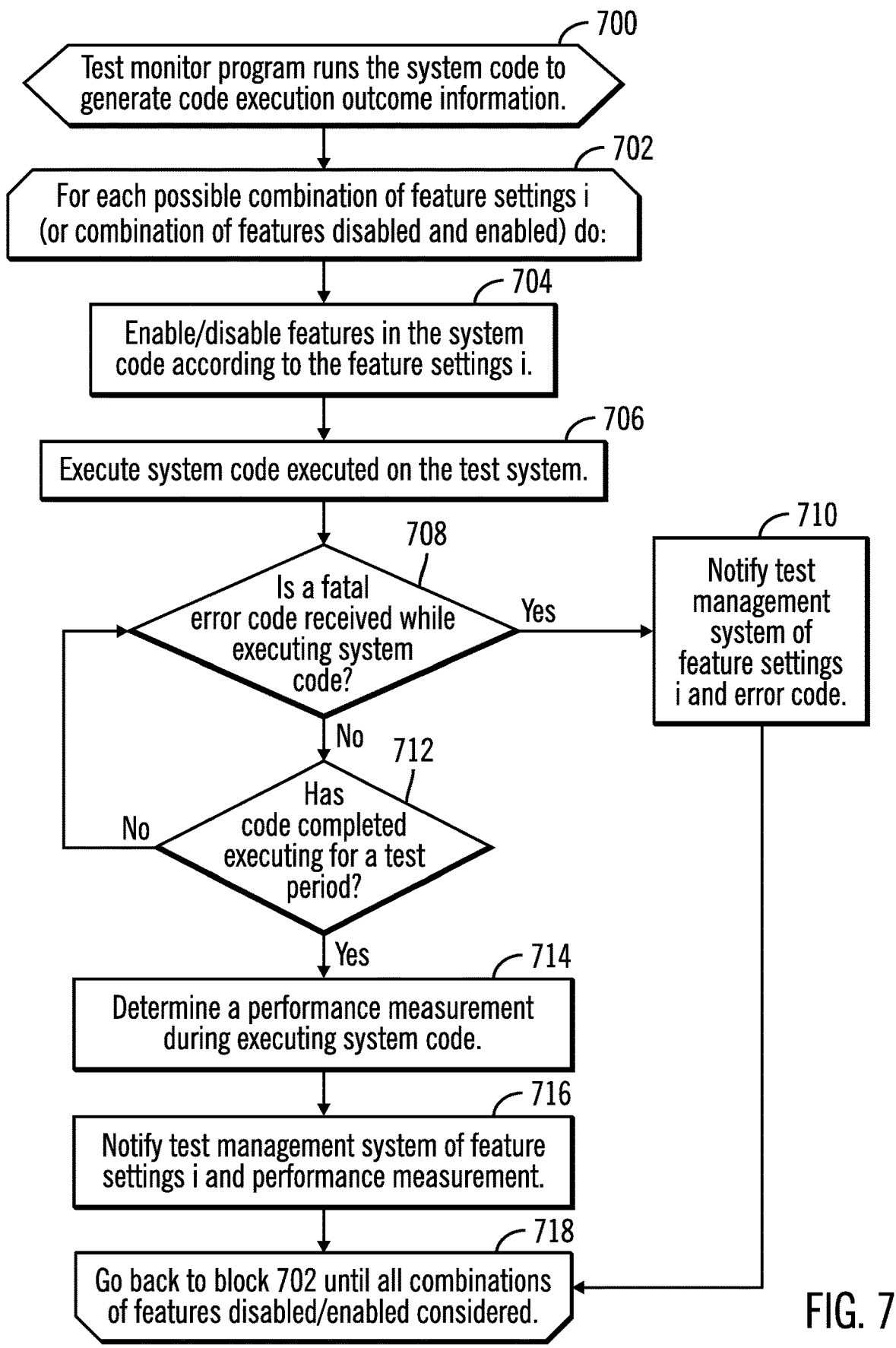
FIG. 7 illustrates an embodiment of operations to run system code at a system to generate code execution outcome information.

FIG. 7 illustrates an embodiment of operations performed by the test monitor program 106 at a test system $300_T$ to run the system code 102 to test. Upon initiating testing (at block 700), the test monitor program 106 performs a loop of operations at blocks 702 through 718 for each possible feature settings i of combinations of the features enabled or disabled. At block 704 the test monitor program 106 enables and disables features, or system settings, according to the feature settings i being tested. The system code 102 is executed (at block 706) on the test system $300_T$. If (at block 708) there is a fatal error code, such as a panic code or fatal error, received while executing the system code 102, then the test management system 100 is notified (at block 710) of the feature settings $506_i$ and error code outcome $508_i$ resulting in the fatal error to use to retrain the machine learning module 110 to disable those features related to the error code for the configuration settings $400_T$ of the test system $300_T$.

If (at block 708) there is no fatal error detected and if (at block 712) the code 102 has completed executing for a test period without a fatal error code, then the test monitor program 106 determines (at block 714) a performance measurement of system $300_T$ during execution of the system code 102, such as I/O latency, response time, processor and memory usage, etc. The test management system 100 is notified (at block 716) of the feature settings $506_i$ and performance measurement outcome $508_i$ for the training manager 108 to use to retrain the machine learning module 110 to enable and disable those features in feature settings set when the best performance measurements were realized. In further embodiments, the user system $300_U$ may report error codes and performance measurement outcomes for the feature settings implemented at the user system $300_U$ while running the system code 102 in a production environment.

With the embodiment of FIG. 7, the test monitor program 106 in the test system $300_T$ may test system performance or run the system code 102 for different combinations of features enabled or disabled to determine system performance for the system code 102 and to check for errors for the features enabled/disabled and the test system configuration settings $400_T$. This information may then be used to retrain the machine learning module 110 according to the operations of FIG. 8 to improve the predictive ability of the machine learning module 110 to determine the best feature settings for a given user configuration settings $400_U$ at a user system $300_U$.

Figure 8:
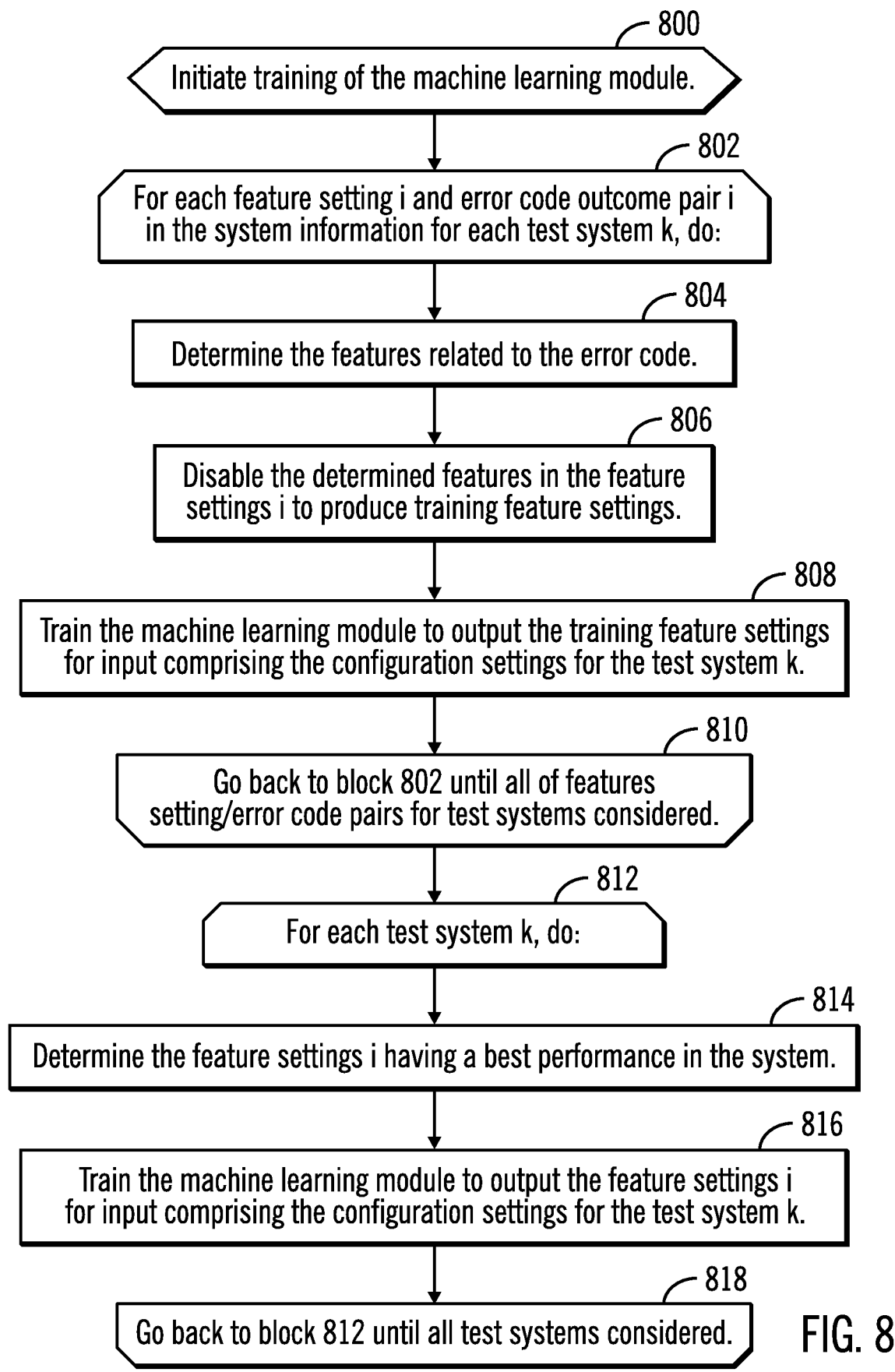
FIG. 8 illustrates an embodiment of operations to train a machine learning module.

FIG. 8 illustrates an embodiment of operations performed by the training manager 108 to train the machine learning module 110. Upon initiating (at block 800) training, the training manager 108 performs a loop of operations at blocks 802 through 810 for each feature setting $506_i$ and error code $508_i$ outcome pair in each test system $300_k$ indicated in the code execution outcome information 500. At block 804, the training manager 108 determines (at block 804) the features related to the error code and disables (at block 806) the determined features in the feature settings $506_i$ to produce training feature settings. The machine learning module 110 is trained (at block 808) to output the training feature settings 216, i.e., modified feature settings $506_i$, based on input comprising the configuration settings 504 for the test system $300_k$ to train to produce the features settings 216 with the features related to the error code disabled.

The training manager 108 further performs a loop of operations at blocks 812 through 818 for each test system $300_k$. At block 814, the training manager 108 determines (at block 814) the feature settings $506_i$ and performance measurement $508_i$ outcome pair in entries $500_i$ for test system $300_k$ that have the best performance measurement $508_i$, according to a performance measurement criteria. The training manager 108 trains (at block 816) the machine learning module 110 to output the determined feature settings $506_i$ in pair with the best performance measurement $508_i$ for input comprising the configuration settings 504 at the test system $300_K$.

In embodiments where the machine learning module 110 comprises a neural network, the module 110 may comprise a collection of "neurons" with "synapses" connecting them that is organized into three main parts: the input layer, the hidden layer, and the output layer. The term "deep" learning implies multiple hidden layers not visible as a network output. Training such a neural network involves calibrating all of the "weights" by repeating two key steps, forward propagation and backward propagation. In forward propagation, a set of weights are applied to the input data 400 to calculate the feature settings output vector 316. In backward propagation, the margin of error in the expected and actual outputs are measured and the weights are adjusted to decrease the error. Neural networks repeat both forward and backward propagation until the weights are calibrated to accurately produce the desired feature settings.

Figure 9:
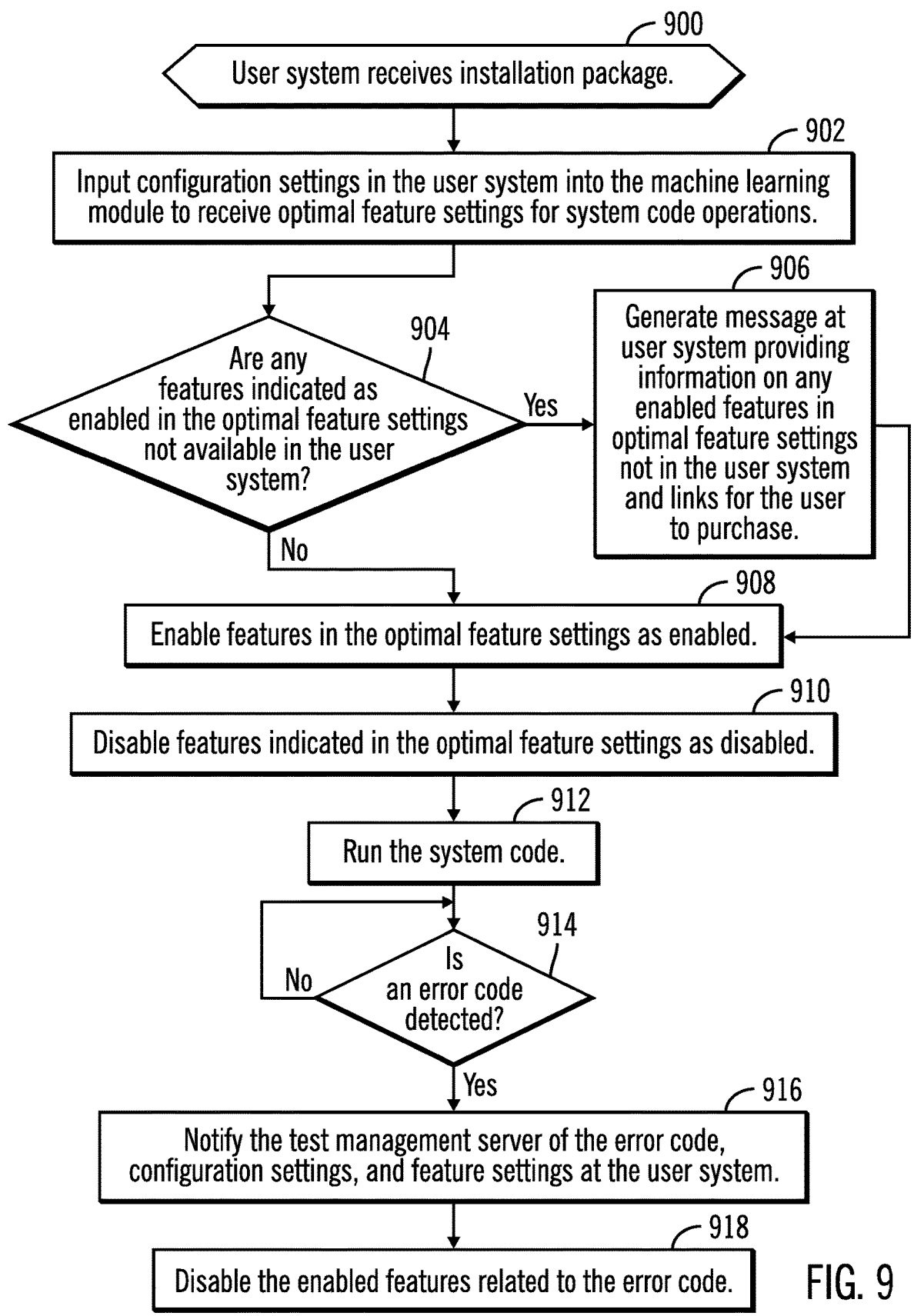
FIG. 9 illustrates an embodiment of operations to deploy the system code and machine learning module at a user system.

With the embodiment of operations of FIG. 8, the machine learning module 110 is retrained based on margins of errors with respect to desired feature settings, such as those having features disabled that are related to a fatal error code and those feature settings when the optimal performance measurements occurred, and the actual output feature settings to optimize the ability of the machine learning module 110 to produce the optimal feature settings based on the configuration settings at the test systems $300_T$ and feature settings outputted before the adjustment FIG. 9 illustrates an embodiment of operations performed by the installer program 208 executing in the user system 300U upon receipt of the installation package 202 and the system code 102 during normal operations. Upon receiving (900) the installation package 202, the installer program 208 is executed to input (at block 902) the configuration settings $400_U$ in the user system $300_U$ into the machine learning module 110 to output the optimal feature settings 316 for system code 102 operations. If (at block 904) any features indicated as enabled in the optimal feature settings 316 are not available in the user system $300_U$, then the installer program 208 generates (at block 906) a message at the user system providing information on any enabled features in the optimal feature settings 316 not available in the user system $300_U$ and links for the user to select to purchase or inquire about the optimal features, whose availability could optimize the running of the system code 102. The installer program 208 may further send a message to the distribution server 204 to alert a salesperson about the option for purchasing the optimal features not available.

If (at block 904) all enabled features in the optimal feature settings 316 are available at the user system $300_U$ or after generating (at block 906) the message, the installer program 208 enables (at block 908) features at the user system $300_U$ indicated in the optimal feature settings as enabled and disables (at block 910) features indicated in the optimal feature settings 316 as disabled. The system code 102 is then installed and executed (at block 912) during normal operations.

If (at block 914), during system code 102 operations, an error code is detected, then the system code 102 notifies (at block 916) the test management system 100 (or some other service) of the error code, configuration settings $400_U$, and feature settings of features enabled and disabled at the user system $300_U$. The test manager system 100 may store the received system information in code execution outcome information 500 to use to retrain the machine learning module 110 according to the operations at blocks 804-808 of FIG. 8. The system code 102 may then disable (at block 918) the enabled features related to the error code.

With the embodiment of FIG. 9, when installing the system code 102 at a user system, the machine learning module 110, which has been trained to produce optimal feature settings for configuration settings 400 input, is used to determine the optimal features settings 316 of features to enable and enable to optimize the execution of the system code 102 to provide best performance of the system code 102.

In the described embodiment, variables i, j, k and n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
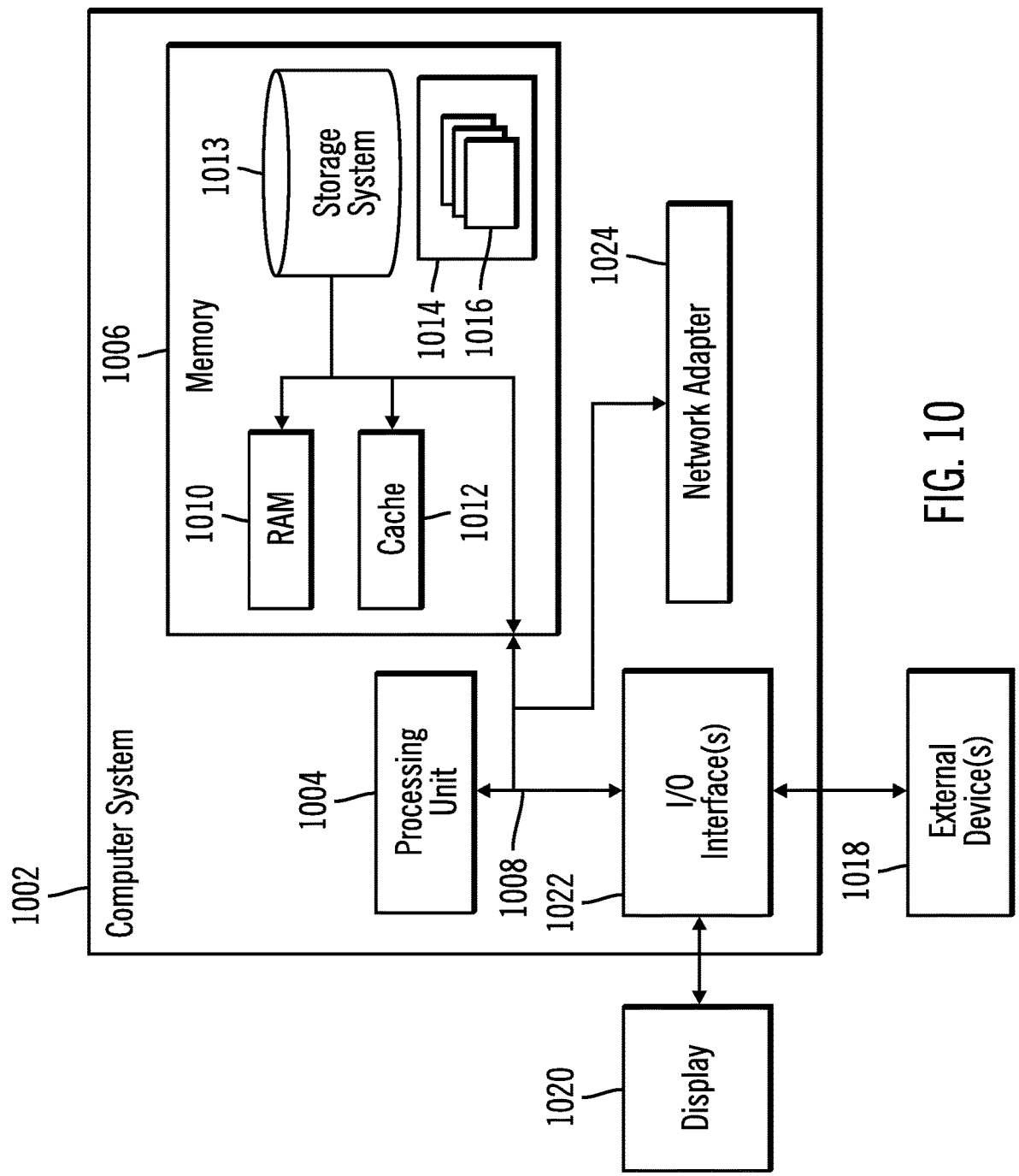
FIG. 10 illustrates a computing environment in which the components of FIGS. 1, 2, and 3 may be implemented.

The computational components of FIG. 1, including the test system $300_T$, test management system 100, user system $300_U$, distribution server 204, and system $300_i$ may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform tasks or implement particular abstract data types. Computer system/server 1002 may be practiced in distributed cloud computing environments where tasks are performed by remote processing devices that are linked through a communications network. In a distributed cloud computing environment, program modules may be in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining feature settings to use for system code, comprising a computer readable storage medium having computer readable program code embodied therein that when executed performs operations, the operations comprising:

determining an outcome of running system code on a system, wherein the system has system resources configured according to configuration settings;

in response to the outcome, determining first feature settings of features of the system code, wherein the first feature settings indicate to enable or disable the features of the system code;

training a machine learning module, resulting in a trained machine learning module, to output the first feature settings in response to input comprising the configuration settings of the system;

providing input configuration settings of the system resources to the trained machine learning module; and receiving, from the trained machine learning module, second feature settings of the features in response to the input configuration settings, wherein the second feature settings indicate to enable or disable the features of the system code.

2. The computer program product of claim 1, wherein the configuration settings are a plurality of a set of configuration settings comprising: storage rank; storage capacity; cache size; number of processor threads; number of point-in-time copies; number of mirroring pairs; number of storage devices with a high speed, low speed, and medium speed; error logs; code level; and wherein the features comprise a plurality of a set of features comprising: synchronize reads; synchronize writes, priority read and write management, caching of data, point-in-time copy, and parallel access volumes to allow parallel access to a volume using alternate addresses to address the volume.

3. The computer program product of claim 1, wherein the determining the outcome comprises:

determining an error code for a detected error occurring while running the system code on the system; and determining at least one feature of the features related to the error code, wherein the first feature settings indicate to disable the determined at least one feature related to the error code.

4. The computer program product of claim 1, wherein the outcome comprises system performance at the system when executing the system code with the features enabled or disabled, wherein the determining the outcome comprises executing the system code at the system with different feature settings for different of the features enabled or disabled to determine system performance measurements for the different feature settings; and wherein the feature settings comprise feature settings resulting in at least one of improve system performance and minimize errors of the determined system performance measurements for the different feature settings.

5. The computer program product of claim 1, wherein the operations further comprise:
running the system code on a plurality of test systems, each test system having different configuration settings, wherein at each of the test systems, the system code is executed with different combinations of feature settings of different of the features enabled or disabled to determine system performance measurements for the different combinations of feature settings set in the system code at the test system, wherein the first feature settings used to train the machine learning module comprise the feature settings resulting in at least one of improve system performance and minimize errors of the determined system performance measurements at the test system,
wherein the training the machine learning module comprises training the machine learning module to produce the first feature settings resulting in the at least one of improve system performance and minimize errors of the determined system performance measurements at the test system.

6. The computer program product of claim 1, wherein the system comprises a test system to train the machine learning module, wherein the operations further comprise:
deploying the system code and the trained machine learning module to a user system to execute to determine user feature settings of features at the user system to enable or disable.

7. The computer program product of claim 6, wherein an installer program is deployed with the system code and the trained machine learning module to the user system, wherein the providing input configuration settings to the trained machine learning module comprises the installer program providing user configuration settings in the user system as input to the trained machine learning module, wherein the second feature settings indicate features at the user system to enable or disable;
wherein the installer program when executed at the user system performs operations comprising:
enabling features at the user system that are indicated in the user feature settings as enabled; and
disabling features at the user system that are indicated in the user feature settings as disabled.

8. The computer program product of claim 6, wherein the system code when deployed in the user system is programmed to perform operations, the operations comprising:
detecting an error code while running the system code on the user system;
determining features related to the error code; and
disabling the determined features related to the error code.

9. The computer program product of claim 8, wherein the system code is further programmed to perform:
transmitting a notification of the error code, the configuration settings at the user system, and the user feature settings to use to retrain the machine learning module to not output the determined features related to the error code for input comprising the configuration settings.

10. The computer program product of claim 6, wherein an installer program is deployed with the system code and the machine learning module to the user system, wherein the providing input configuration settings to the trained machine learning module comprises the installer program providing configuration settings in the user system as input to the trained machine learning module, wherein the second feature settings indicate features at the user system to enable or disable;
wherein the installer program when executed at the user system performs operations comprising:
for each feature indicated as enabled in the received second feature settings, determining whether the system code at the user system supports the feature; and
send a notification having information on the feature not supported at the user system to allow the operator of the user system to purchase the feature to enable in the system code.

11. A system for determining feature settings to use for system code, comprising:
a processor; and
a computer readable storage medium having computer readable program code embodied therein that when executed performs operations, the operations comprising:
determining an outcome of running system code on a system, wherein the system has system resources configured according to configuration settings;
in response to the outcome, determining first feature settings of features of the system code, wherein the first feature settings indicate to enable or disable the features of the system code;
training a machine learning module, resulting in a trained machine learning module, to output the first feature settings in response to input comprising the configuration settings of the system;
providing input configuration settings of the system resources to the trained machine learning module; and
receiving, from the trained machine learning module, second feature settings of the features in response to the input configuration settings, wherein the second feature settings indicate to enable or disable the features of the system code.

12. The system of claim 11, wherein the determining the outcome comprises:
determining an error code for a detected error occurring while running the system code on the system; and
determining at least one feature of the features related to the error code, wherein the feature settings indicate to disable the determined at least one feature related to the error code.

13. The system of claim 11, wherein the outcome comprises system performance at the system when executing the system code with the features enabled or disabled,
wherein the determining the outcome comprises executing the system code at the system with different feature settings for different of the features enabled or disabled to determine system performance measurements for the different feature settings; and
wherein the feature settings comprise feature settings resulting in at least one of improve system performance and minimize errors of the determined system performance measurements for the different feature settings.

14. The system of claim 11, wherein the operations further comprise:
running the system code on a plurality of test systems, each test system having different configuration settings, wherein at each of the test systems, the system code is executed with different combinations of feature settings of different of the features enabled or disabled to determine system performance measurements for the different combinations of feature settings set in the system code at the test system, wherein the first feature settings used to train the machine learning module comprise the feature settings resulting in at least one of improve system performance and minimize errors of the determined system performance measurements at the test system, wherein the training the machine learning module comprises training the machine learning module to produce the first feature settings resulting in the at least one of improve system performance and minimize errors of the determined system performance measurements at the test system.

15. The system of claim 11, wherein the system comprises a test system to train the machine learning module, wherein the operations further comprise:

deploying the system code and the trained machine learning module to a user system to execute to determine user feature settings of features at the user system to enable or disable.

16. A method for determining feature settings for system code, comprising:

determining an outcome of running system code on a system, wherein the system has system resources configured according to configuration settings;

in response to the outcome, determining first feature settings of features of the system code, wherein the first feature settings indicate to enable or disable the features of the system code;

training a machine learning module, resulting in a trained machine learning module, to output the first feature settings in response to input comprising the configuration settings of the system providing input configuration settings of the system resources to the trained machine learning module; and receiving, from the trained machine learning module, second feature settings of the features in response to the input configuration settings, wherein the second feature settings indicate to enable or disable the features of the system code.

17. The method of claim 16, wherein the determining the outcome comprises:

determining an error code for a detected error occurring while running the system code on the system; and determining at least one feature of the features related to the error code, wherein the feature settings indicate to disable the determined at least one feature related to the error code.

18. The method of claim 16, wherein the outcome comprises system performance at the system when executing the system code with the features enabled or disabled, wherein the determining the outcome comprises executing the system code at the system with different feature settings for different of the features enabled or disabled to determine system performance measurements for the different feature settings; and wherein the feature settings comprise feature settings resulting in at least one of improve system performance and minimize errors of the determined system performance measurements for the feature settings.

19. The method of claim 16, further comprising:

running the system code on a plurality of test systems, each test system having different configuration settings, wherein at each of the test systems, the system code is executed with different combinations of feature settings of different of the features enabled or disabled to determine system performance measurements for the different combinations of feature settings set in the system code at the test system, wherein the first feature settings used to train the machine learning module comprise the feature settings resulting in at least one of improve system performance and minimize errors of the determined system performance measurements at the test system, wherein the training the machine learning module comprises training the machine learning module to produce the first feature settings resulting in at least one of improve system performance and minimize errors of the determined system performance measurements at the test system.

20. The method of claim 16, wherein the system comprises a test system to train the machine learning module, further comprising:

deploying the system code and the trained machine learning module to a user system to execute to determine user feature settings of features at the user system to enable or disable.

* * * * *